United States Patent Office 3,265,709
Patented August 9, 1966

---

3,265,709
ANTHRAQUINONE DYESTUFFS AND PROCESS FOR THE PRODUCTION THEREOF
Kurt Klemm, Leverkusen, and Günter Gehrke, Cologne-Flittard, Germany, assignors to Farbenfabriken Bayer Aktiengesellschaft, Leverkusen, Germany, a corporation of Germany
No Drawing. Filed Dec. 14, 1962, Ser. No. 244,550
Claims priority, application Germany, Dec. 23, 1961, F 35,647
9 Claims. (Cl. 260—329.2)

This invention relates to new anthraquinone dyestuffs and to their production.

It has been found that valuable anthraquinone dyestuffs are obtained if boric acid esters of p-diamino or p-dimonoalkyl amino 1,5-dihydroxy anthraquinone-2,6-disulfonic acids are reacted with optionally substituted thiophene, the sulfonic acid groups are optionally split off in known manner, and the dyestuffs are then halogenated, if desired.

When 1,5-dihydroxy anthraquinones containing monoalkyl amino groups are used for the preparation of the new dyestuffs, the corresponding amino compounds containing preferably lower alkyl groups are suitable, e.g. alkyl groups having up to four carbon atoms, such as methyl-, ethyl- or propyl-amino compounds. Apart from thiophene itself, the corresponding substitution products can be employed, e.g. alkyl, preferably lower alkyl, aryl, preferably phenyl, aralkyl or halogen-substituted thiophene. Examples of these compounds are the following: thiophene, 2-bromo thiophene, 2-chloro thiophene, 2-methyl thiophene, 2-ethyl thiophene, 2-phenyl thiophene, 2-benzyl thiophene and thionaphthene.

The reaction of the boric acid esters of 4,8-diamino-1,5-dihydroxy anthraquinone disulfonic acids with the thiophene is preferably carried out in sulfuric acid, the concentration suitably being approximately 85 to 96%. The reaction is conducted preferably at temperatures lying at about room temperature or at a lower temperature, for example, at 0 to 15° C. The splitting off of the sulfonic acids can then be carried out in a manner known as such. The anthraquinone dyestuffs thus obtained can, if further desired, be halogenated, e.g. brominated or chlorinated, the halogenation being conducted expediently in inorganic or organic diluents, e.g. by adding bromine or chlorine. The dyestuffs thus obtained represent mixtures of non-halogenated and various highly halogenated dyestuffs. The dyestuffs thus obtained preferably contain on average 0.25 to 1.5 halogen atoms per dyestuff molecule. The halogenation occurs mainly in the α-position of the thiophene radical.

The dyestuffs produced according to the invention as monosulfonic acids are valuable wool dyestuffs; the dyestuffs free from sulfonic acid groups, on the other hand, dye themselves or mixed, in a suitably fine state of division, acetate, polyamide and especially polyester fibers, e.g. polyethylene glycol terephthalate in fast blue to blue-green shades of outstanding fastness to subliming, rubbing, exhaust gas, perspiration and light. They can, moreover, be employed as dyestuff intermediates.

The following examples are given for the purpose of illustrating the invention.

Example 1

(a) A mixture of 20 parts by weight of 1,5-dihydroxy-4,8-diamino anthraquinone-2,6-disulfonic acid and 10 parts by weight of boric acid are stirred into 70 parts by volume of 91% sulfuric acid and heated for one hour at 70° C. The clear blue melt is cooled to 10° C., 10 parts by weight of thiophene are added, stirred for one hour at 10 to 15° C., the reaction mixture is subsequently introduced into 2000 parts by volume of ice-water, and the yellow-green solution thus obtained is heated, to complete the splitting off of the first sulfonic acid group, for 1 to 2 hours at 80 to 90° C. with stirring. The separated reaction product is filtered off with suction and washed neutral in the usual way with the addition of a dilute sodium chloride solution; it possesses the following constitution:

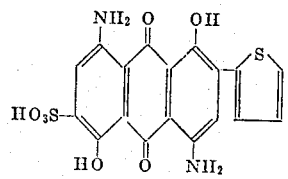

(b) The filter residue obtained according to Example 1(a) and washed neutral, is stirred well in 600 parts by volume of water and 80 parts by volume of pyridine. The suspension is heated to 90° C., and at this temperature sufficient sodium dithionite is added slowly in portions, required for the complete splitting off of the sulfonic acid group; the separated dyestuff of the following constitution

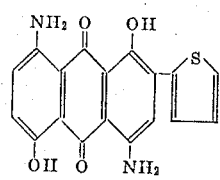

is filtered off with suction, washed neutral and dried.

(c) 100 parts by weight of a fabric of polyester fibers are dyed in a bath which contains one part by weight of the above described dyestuff in finely divided form and 16 parts by weight of o-cresotic acid methyl ester in 4000 parts by volume of water, for 120 minutes at boiling temperature. A clear blue dyeing is obtained of outstanding fastness properties.

Example 2

(a) A mixture of 10 parts by weight of 1,5-dihydroxy-4,8-dimonomethyl amino anthraquinone - 2,6 - disulfonic acid and 5 parts by weight of boric acid are heated for one hour at 70° C. with stirring in 40 parts by volume of 91% sulfuric acid. The clear blue melt is cooled to 10° C., 5 parts by weight of thiophene are added, stirred for 45 minutes at 10 to 13° C., the reaction mixture is subsequently poured into 400 parts by volume of ice-water and then rendered alkaline by slowly adding a 40% caustic soda solution, the temperature being maintained below 40° C. After several hours standing the separated reaction product is filtered off with suction, and washed until neutral in the usual way; it possesses the following constitution:

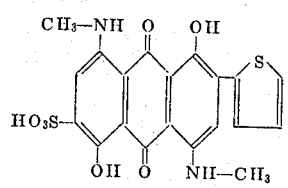

(b) In the reaction product obtained according to Example 2(a) and washed till neutral, the sulfonic acid group is split off as described in Example 1(b). A dyestuff is obtained of the following constitution:

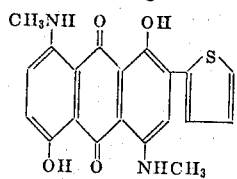

(c) 100 parts by weight of polyester fibers (polyethylene glycol terephthalate) are dyed in a pressure dyeing apparatus at 130° C. for one hour in a bath which contains in a finely divided form one part by weight of the dyestuff described above and 6 parts by weight of a condensation product from 2 mol naphthalene sulfonic acid and 1 mol formaldehyde in 3,000 parts of water. A clear blue-green dyeing is obtained which possesses a very good fastness properties.

*Example 3*

A mixture of 20 parts by weight of 1,5-dihydroxy-4,8-diamino-anthraquinone-2,6-disulfonic acid and 10 parts by weight of boric acid is stirred into 70 parts by volume of 91% sulfuric acid and heated at 70° C. for one hour. The clear blue melt is cooled to 10° C., 13 parts by weight of α-bromo thiophene are added, followed by stirring at 10–14° C. for one hour and the mixture is worked up as described in Example 1(a) and 1(b). The blue dyestuff obtained possesses the following constitution:

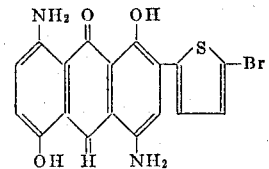

*Example 4*

50 parts by weight of the dyestuff obtained as described in Example 1(a) and 1(b) are stirred at 20° C. into 50 parts by volume of 87% sulfuric acid with addition of 2.0 parts by weight of boric acid and then 0.2 part by volume of bromine are added. After 30 minutes, the melt is placed on ice, briefly heated to 60° C., filtered off and washed till neutral and dried. The new dyestuff obtained contains 6% of bromine.

*Example 5*

(a) 5 parts by weight of 1,5-dihydroxy-4,8-diamino anthraquinone-2,6-disulfonic acid and 2.5 parts by weight of boric acid are stirred into 20 parts by volume of 88% sulfuric acid and heated at 70° C. for 1½ hours. The blue melt is cooled to 10° C. and at this temperature 5.0 of α-ethyl thiophene are added, stirred for 30 minutes at 10–13° C., and the reaction mixture is worked up as described in Example 2. The reaction product possesses the following constitution:

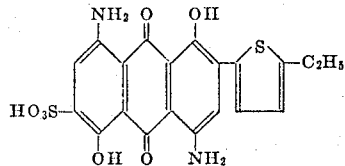

(b) The sulfonic acid group is split off according to the process described in Example 1(b). The dyestuff thus obtained in beautiful crystals having the following constitution:

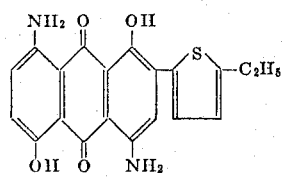

dyes polyester fibers in clear greenish blue shades of outstanding fastness properties.

*Example 6*

(a) A mixture of 10 parts by weight of 1,5-dihydroxy-4,8-diamino anthraquinone-2,6-disulfonic acid and 5.0 parts by weight of boric acid is introduced into 50 parts by volume of 88% sulfuric acid, as described in Example 5(a), and heated at 70° C. for two hours. After cooling to 10° C., 5.0 parts by weight of α-benzyl thiophene are added dropwise and stirred for 15 minutes at 10° C. Working up then proceeds in an alkaline medium according to Example 2. The sulfonic acid obtained possesses the following constitution:

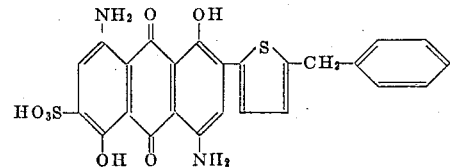

(b) The sulfonic acid group is split off in analogy with Example 1(b). The blue dyestuff thus obtained possesses the following constitution:

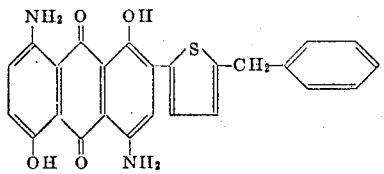

We claim:
1. A compound of the formula

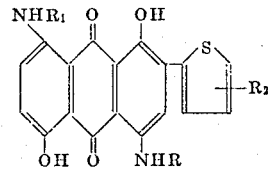

wherein R and $R_1$ represent a member selected from the group consisting of hydrogen and a lower alkyl group and wherein $R_2$ represents a member selected from the group consisting of hydrogen, halogen, lower alkyl, phenyl and phenyl lower alkyl.

2. Dyestuff of the formula

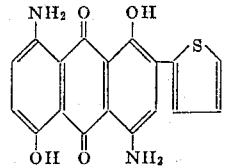

3. Dyestuff of the formula

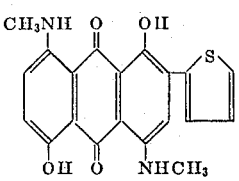

4. Dyestuff of the formula

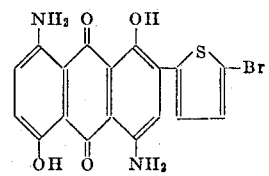

5. Dyestuff of the formula

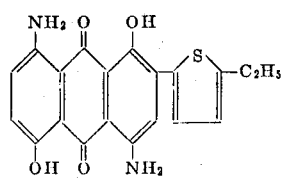

6. Dyestuff of the formula

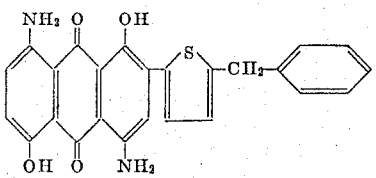

7. A process for producing an anthraquinone dyestuff comprising contacting a member selected from the group consisting of 1,5-dihydroxy-4,8-diamino anthraquinone-2,6-disulfonic acid and 1,5-dihydroxy-4,8-di-mono alkyl-amino anthraquinone-2,6-disulfonic acid with an active amount of a member selected from the group consisting of thiophene, lower alkyl substituted thiophene, aryl substituted thiophene, aralkyl substituted thiophene, halo substituted thiophene, and thionaphthene; effecting the reaction in the presence of boric and sulfuric acid at about 0° C. to about room temperature, and recovering the resulting product.

8. Process as claimed in claim 7 comprising reacting the dye product with a halogenating agent selected from the group consisting of a brominating and a chlorinating agent.

9. The dyestuff obtained by halogenating the product obtained according to claim 7, consisting in admixing about 50 parts by weight of said product with about 50 parts by volume of sulfuric acid and about 2 parts by weight of boric acid, adding about .2 part by volume of a halogenating agent selected from the group consisting of chlorine and bromine, heating to about 60° C., and recovering the resulting dyestuff.

References Cited by the Examiner
FOREIGN PATENTS

| | | |
|---|---|---|
| 1,021,398 | 12/1952 | France. |
| 1,062,104 | 12/1953 | France. |
| 445,269 | 6/1927 | Germany. |
| 351,253 | 2/1961 | Switzerland. |

OTHER REFERENCES

Farbwerke Chem. Abstracts, vol. 54 (1960), page 14710.

Gilman et al., Jour. Amer. Chem. Soc., vol. 47 (1925), pp. 245 and 246.

Lubs, The Chemistry of Synthetic Dyes and Pigments, Reinhold Pub. Corp., New York (1955), pages 355 and 356.1.

WALTER A. MODANCE, *Primary Examiner.*

JOHN D. RANDOLPH, *Examiner.*

JAMES A. PATTEN, *Assistant Examiner.*